United States Patent [19]

Eike et al.

[11] Patent Number: 5,904,228
[45] Date of Patent: May 18, 1999

[54] BRAKE CONTROL SYSTEM AND RELATED METHOD

[75] Inventors: Craig R. Eike, DeKalb; Guy T. Stoever, Naperville, both of Ill.

[73] Assignee: Case Corporation, Racine, Wis.

[21] Appl. No.: 08/808,018

[22] Filed: Mar. 3, 1997

Related U.S. Application Data

[63] Continuation-in-part of application No. 08/694,559, Aug. 9, 1996, Pat. No. 5,738,142.

[51] Int. Cl.$^6$ .................................................... F16D 65/24
[52] U.S. Cl. ......................................... 188/170; 303/9.76
[58] Field of Search .......................... 188/170; 303/9.76; 137/596.17; 251/129.14; 91/447

[56] References Cited

U.S. PATENT DOCUMENTS

| | | | |
|---|---|---|---|
| 3,974,896 | 8/1976 | Rach | 188/170 |
| 4,432,585 | 2/1984 | Nezuka | 303/10 |
| 4,458,791 | 7/1984 | Schneider et al. | 188/170 |
| 4,505,355 | 3/1985 | Scheurenberg et al. | 188/170 X |
| 4,607,730 | 8/1986 | Paisley | 188/170 |
| 4,616,882 | 10/1986 | Bueno | 188/170 X |
| 4,813,518 | 3/1989 | Akiyama et al. | 188/170 |
| 4,856,622 | 8/1989 | Sartain et al. | 188/170 |
| 5,186,284 | 2/1993 | Lamela et al. | 188/71.8 |
| 5,203,616 | 4/1993 | Johnson | 303/10 |
| 5,353,895 | 10/1994 | Camack et al. | 188/170 X |
| 5,370,449 | 12/1994 | Edelen et al. | 303/3 |
| 5,409,303 | 4/1995 | Engelbert et al. | 303/118.1 |
| 5,458,402 | 10/1995 | Jeffery | 303/13 |
| 5,779,325 | 7/1998 | Diesel | 188/170 X |

*Primary Examiner*—Peter M. Poon
*Attorney, Agent, or Firm*—Jansson, Shupe, Bridge & Munger, Ltd.

[57] ABSTRACT

A simplified brake control system comprises a source of pressurized fluid, a spring-set brake with a hydraulic release mechanism and a control valve connected between the brake and the source. The control valve has a valve body and a flow control mechanism in the body and mounted for movement between a first (solenoid-energized) position and a second (solenoid-de-energized) position. A one-way check valve is built into the valve body. How the system operates depends upon two factors, namely, (a) whether the valve flow control mechanism is in its first or its second position, and (b) the relationship of the pressure of the source, i.e., the first pressure, and the second pressure in the release mechanism. When the flow control mechanism is in the first position, the release mechanism may be pressurized for brake release. And when such mechanism is in the second position, the release mechanism is vented to the reservoir through the brake port, the second passage and the drain port. A new method for controlling a brake is also disclosed.

16 Claims, 7 Drawing Sheets

BRAKE CONTROL SYSTEM AND RELATED METHOD

RELATED APPLICATION

This application is a continuation-in-part of application Ser. No. 08/694,559 filed on Aug. 9, 1996 now U.S. Pat. No. 5,738,142, titled "PRESSURE HOLDING DIRECTIONAL CONTROL VALVE" and assigned to the same assignee as this application.

FIELD OF THE INVENTION

The invention relates generally to brakes and, more particularly, to vehicular brakes used for parking and emergency stopping.

BACKGROUND OF THE INVENTION

As generally discussed in U.S. Pat. No. 5,186,284 (Lamela et al.) and U.S. Pat. No. 5,409,303 (Engelbert et al.) and as otherwise commonly known, spring-set, pressure-released brakes are often used on over-the-highway or off-road vehicles as parking and/or emergency brakes. U.S. Pat. No. 5,203,616 (Johnson) describes an electro-hydraulic parking brake control system (involving a seemingly-complex circuit) in which the spring-applied parking brake is set if the transmission shift lever is in "Park" or if the vehicle is shut down and motionless, either event de-energizing the parking brake control valve solenoid. A check valve is said to insure that the brake release chamber is not sumped in the event a particular pump fails.

Brakes of the spring-set, pressure-released type are particularly well suited for parking or emergency purposes since braking is caused by spring force rather than by hydraulic or pneumatic pressure as with the vehicle service brakes. The rationale is that while pressure-operated service brakes are highly reliable, a spring-applied brake is even more so.

But spring-applied, pressure-released brakes are not without difficulty. Brake-releasing fluid under pressure is required to be continuously applied to the brake in order to keep the brake released. Such fluid is often obtained from a hydraulic or pneumatic control line, the pressure in which is regulated at a rather low level, e.g., 300 psi. Other vehicle systems, e.g., shifting transmissions, may also rely for control pressure upon the same line.

When, for example, a transmission is shifted by applying fluid pressure to one or more of the transmission shift mechanisms, the resulting demand on the control line may cause the control line pressure and, notably, the brake pressure to momentarily dip well below the regulated pressure. It is not unusual for a spring-applied brake to momentarily set during such a dip in pressure or to at least start to set. The resulting brake "grab," however brief, is quite noticeable to the operator.

A new, simpler brake control system and a new method which improve system reliability and which are suitable for use with spring-set, pressure-released brakes would be a notable advance in the art.

OBJECTS OF THE INVENTION

It is an object of the invention to provide a new brake control system and method which address shortcomings of the prior art.

Another object of the invention is to provide a new brake control system and method suitable for use with spring-set, pressure-released brakes.

Another object of the invention is to provide a new brake control system and method in which brake release and setting is controlled by a single valve.

Yet another object of the invention is to provide a new brake control system and method which substantially eliminate momentary brake "grabbing" due to temporary reduction in control pressure.

Another object of the invention is to provide a new brake control system and method which permit a spring-set, pressure-released brake to be released or set by positioning a single valve. How these and other objects are accomplished will become apparent from the following descriptions and from the drawings.

SUMMARY OF THE INVENTION

The invention involves a brake control system comprising a source of fluid at a first pressure. The system also has a brake and a solenoid-operated control valve connected between the brake and the source. The brake includes a friction member, a braking member and a spring for urging the friction member against the braking member. The brake also has a hydraulic release mechanism for urging the friction member away from the braking member when the pressure in such mechanism is at or above that pressure at which the brake is released. The pressure in the release mechanism is referred to herein as the second pressure.

The control valve includes a valve body with brake, inlet and drain ports. The brake port is coincident with a valve axis along which the below-described flow control mechanism moves and the inlet port and the drain port are spaced from such axis.

The brake port is connected to the hydraulic release mechanism directly rather than through any intervening valve, the function of which may otherwise affect the operation of the system. The inlet port is connected to the source and the drain port is connected to a reservoir. A one-way valve is built into the valve body and comprises a check device, e.g., a ball, and a seat. The one-way valve is in a first passage in the valve body and the body also has a second passage formed therein.

The control valve also has a flow control mechanism built into the body. Such flow control mechanism is mounted for movement between a first position when the valve solenoid is energized and a second position when such solenoid is de-energized.

How the system operates depends upon two factors, namely, (a) whether the control valve flow control mechanism is in its first or energized position or its second, de-energized position, and (b) the relationship of the pressure of the source, i.e., the first pressure, and the second pressure in the release mechanism. When the flow control mechanism is in the first position, the release mechanism may be pressurized for brake release. And when such mechanism is in the second position, the release mechanism is vented to the reservoir through the brake port, the second passage and the drain port.

More specifically, when the flow control mechanism is in the first position, the one-way valve is in series with the brake, the brake port, the inlet port and the source of pressurized fluid. The first passage connects the brake port and the inlet port to one another when the first pressure, i.e., the pressure at the source, is greater than the second pressure. On the other hand, the one-way valve blocks the brake port when the mechanism is in the first position and when the second pressure is greater than the first pressure.

The flow control mechanism includes a stem-like plunger that moves along the valve axis mentioned above. When the flow control mechanism is in its second position (with the solenoid de-energized), the plunger retains the check device away from the seat when the mechanism is in the second position. And in such second position, the brake port and the drain port are connected to one another through the second passage formed in the valve body.

Another aspect of the invention involves a new method for controlling a brake connected in a brake control circuit having (a) a source of pressurized fluid at a first pressure, (b) a brake, and (c) a control valve connected between the brake and the source. The method includes the steps of providing the brake with a friction member, a braking member and a spring urging the friction member toward the braking member and also having a hydraulic release mechanism containing fluid at a second pressure and retaining the friction member in spaced relationship to the braking member.

The control valve is configured to have a valve body containing a check valve connected between the source and the brake. The check valve is closed when the first pressure becomes less than the second pressure.

In a more specific aspect of the method, the configuring step includes configuring the control valve with a flow control mechanism mounted in the body for movement between a first position and a second position. And the closing step occurs when the mechanism is in the first position. Even more specifically, the configuring step includes configuring the control valve to have a brake port and the method includes the step of connecting the brake port directly to the release mechanism.

Other aspects of the invention are set forth in the following detailed description and in the drawings.

DETAILED DESCRIPTIONS OF PREFERRED EMBODIMENTS

Figure 1:
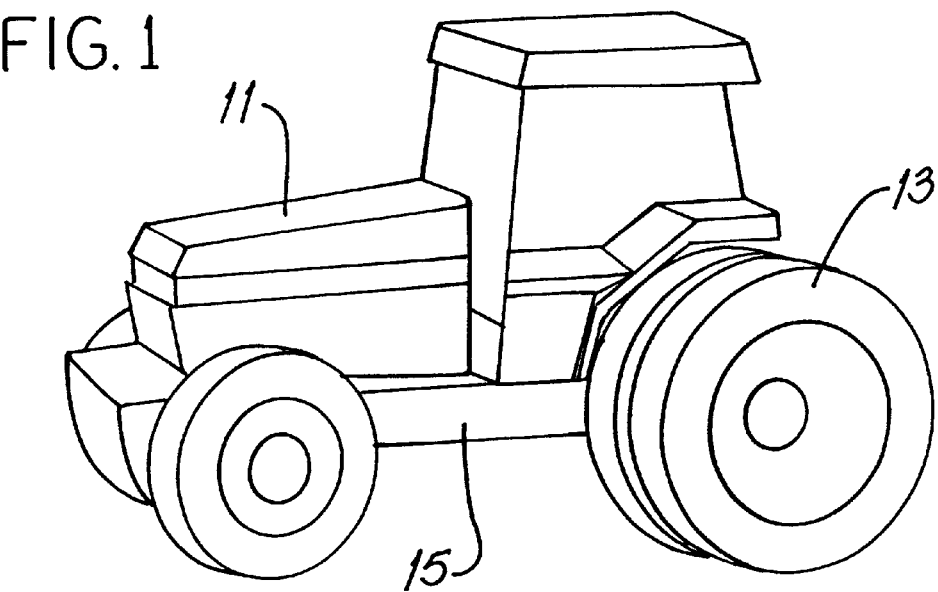
FIG. 1 is a perspective view of an exemplary machine, an agricultural tractor, upon which the new system may be used.

Before describing the new brake control system 10 and related method, it will be helpful to have an understanding of an exemplary machine upon which such system 10 and method may be used. FIG. 1 shows an agricultural tractor 11 having an engine driving the rear wheels 13. The tractor 11 has a frame 15 and the significance of such frame 15 is described below.

Figure 3:
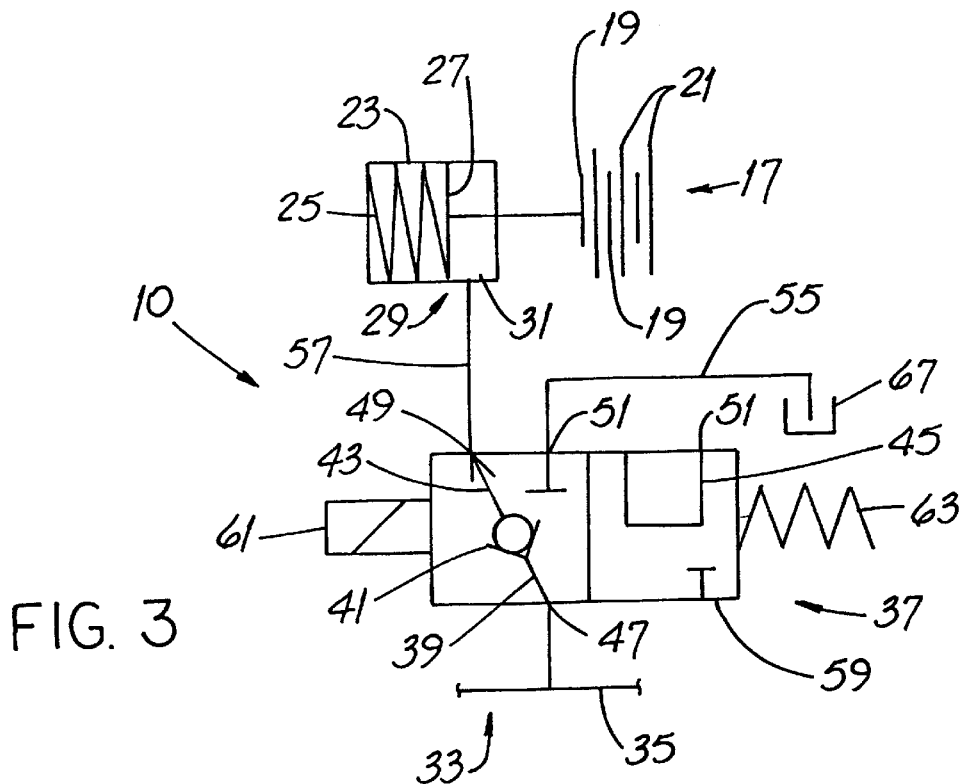
FIG. 3 is a symbolic drawing showing the system with the new control valve in the "solenoid-energized" position.
Figure 2:
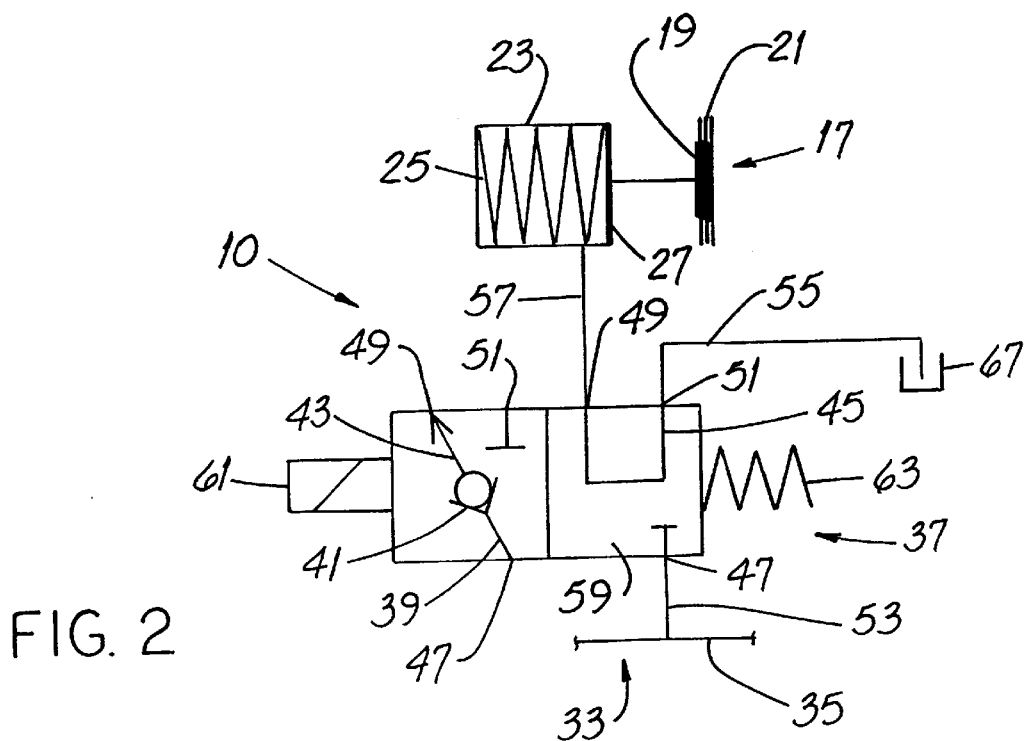
FIG. 2 is a symbolic drawing showing the system with the new control valve in the "solenoid de-energized" position.

Referring next to FIGS. 2 and 3, the brake control system 10 includes a spring-set, hydraulically-released brake 17 having plural friction members 19 which move with the piston, plural brake members 21, a cylinder 23 and a spring 25 in the cylinder 23 which, because of the force it applies to the piston 27, urges the friction members 19 against the braking members 21. A hydraulic release mechanism 29 includes the piston 27 and a chamber 31 defined by the piston 27 and the cylinder 23.

The spring 25 acts in one direction against the piston 27 (to the right in FIGS. 2 and 3) and pressure in the chamber 31 acts in the opposite direction against such piston 27. When the force on the piston 27 resulting from chamber pressure is less than the spring force, the piston 27 moves rightwardly to the position shown in FIG. 2 and urges the friction members 19 against the brake members 21 to set the brake 17. And when the force on the piston 27 resulting from chamber pressure is greater than the spring force, the piston 27 is in the position shown in FIG. 3 and the brake 17 is released.

The friction members 19 move with the piston 27 and while the brake members 21 are mounted to move axially, they are prevented from rotating by being anchored to the frame 15, tractor transmission or other tractor structure. Brakes 17 of the foregoing type are known per se.

The system 10 also includes a pressure source 33, preferably a regulated source, i.e., a source maintained at a substantially constant pressure, e.g., 300 psi. Such source 33 may comprise a hydraulic line 35 used for control purposes such as brake control, transmission shifting and the like. In this specification, the pressure of the source 33 is referred to as a "first pressure" while the pressure prevailing in the brake chamber 31 is referred to as a "second pressure," both irrespective of the relative magnitudes of such pressures.

The control valve 37 has a first passage 39 in which is mounted a one-way valve 41. That is, the valve 41 permits flow along the passage 39 in the direction of the arrow 43 but prevents flow in the opposite direction. The control valve 37 also has a "loop" second passage 45, the purpose of which is described below. Plumbing connections (hydraulic hose or tubing) are made to the valve 37 at the inlet port 47, the actuator/brake port 49 and the drain port 51.

The following is a description of the way in which the system 10 generally operates. A more detailed description follows. When considering FIGS. 2 and 3, it is helpful to "visualize" the operation of the valve 37 by assuming that the lines 53, 55, 57 are stationary and that the rectangular border 59 moves horizontally with respect to such lines 53, 55, 57 when the solenoid 61 is energized or de-energized.

When the valve solenoid 61 is energized, the magnetic force of such solenoid 61 overcomes the force exerted by the valve spring 63 and the valve is at the pressure position shown in FIG. 3. In such position, the chamber 31 is in flow communication with the source 33 via the inlet port 47, the first passage 39 and the brake port 49.

The pressure at the source 33 is assumed to be greater than the pressure in the chamber 31 of the release mechanism 29.

Thus, the chamber pressure rises to, nominally, that of the source 33, the piston 27 moves leftwardly and the brake 17 is released.

When the valve solenoid 61 is de-energized, the valve 37 is at the drain position shown in FIG. 2. In such position, the inlet port 47 is blocked and the chamber 31 is connected directly to the reservoir 67 via the brake port 49, the second passage 45 and the drain port 51. Since chamber pressure is thereby diminished to 0 psi or nearly so, the spring 25 causes the brake 17 to set.

Figure 5:
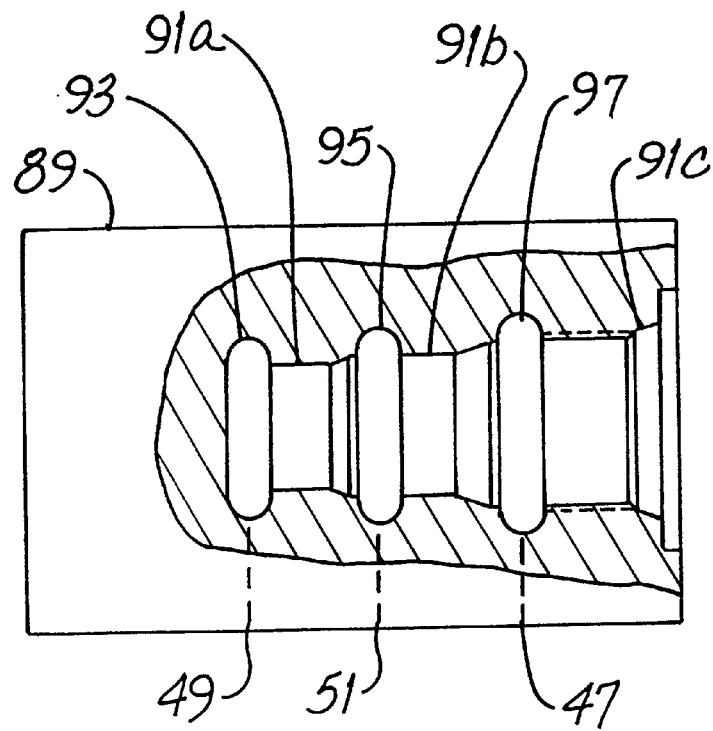
FIG. 5 is a view, partly in section, of a manifold envelope.
Figure 4:
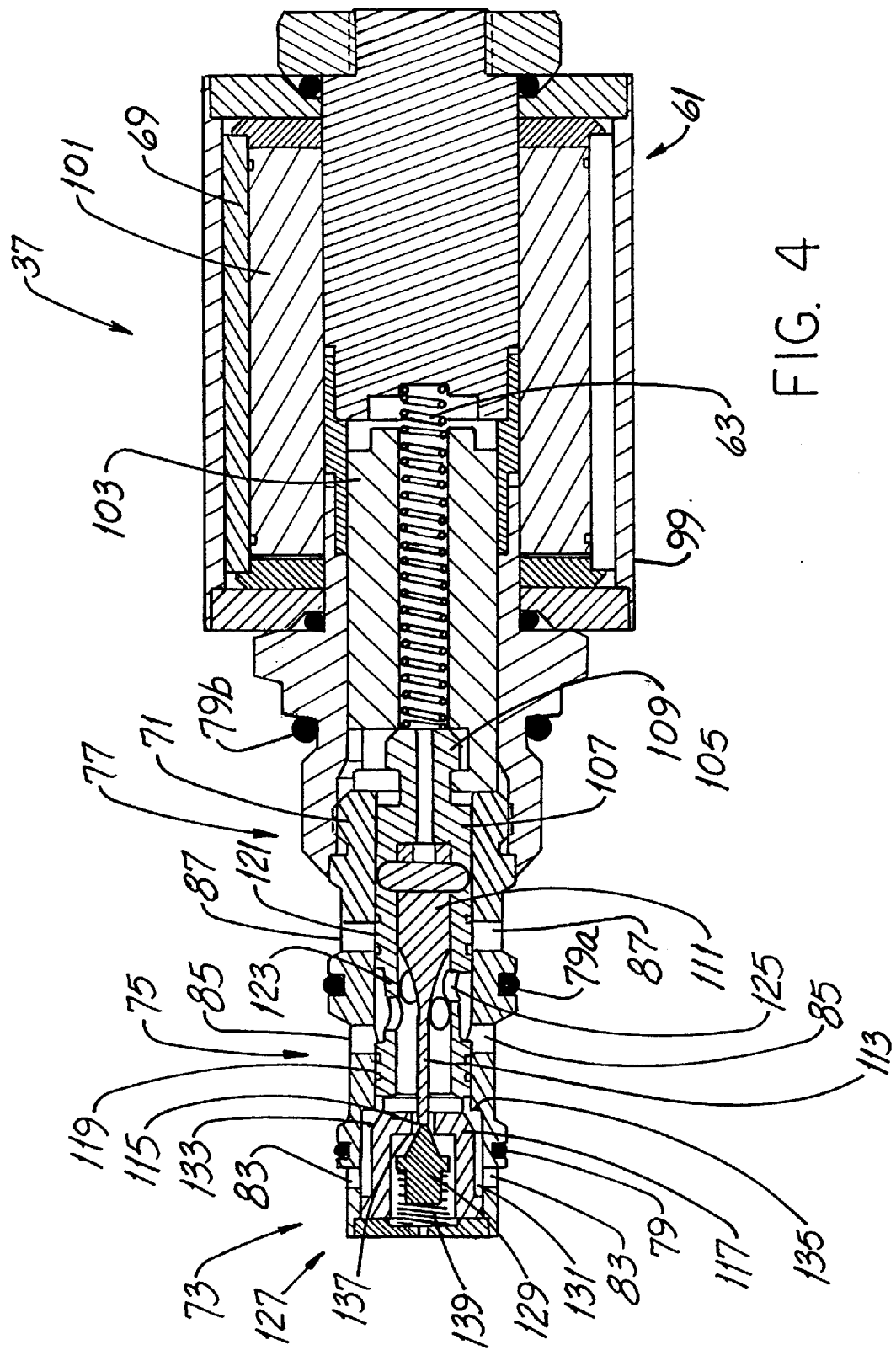
FIG. 4 is a sectional view of the new control valve removed from its manifold envelope.

Details of the construction of the control valve 37 will now be set forth. Referring also to FIGS. 4 and 5, the new control valve 37 has what is often referred to as a "cartridge" configuration because it can be plugged into a manifold to which one or more other cartridge-type valves can be mounted and a number of "plumbed" hydraulic connections can be made.

The valve 37 includes a solenoid assembly 69 and a valve body 71, the latter having three operative sections divided along its length, including an actuator section 73, a drain section 75 and a pressure section 77. Sections 73, 75, 77 are isolated from one another by means of O-rings 79, 79a, 79b or similar sealing devices fitted within appropriate grooves. The actuator section 73 of the valve body 71 has openings 83, the drain section 75 has openings 85, and the pressure section 77 has openings 87, formed therein. And the envelope 89 includes an inlet port 47, a tank or drain port 51 and a brake port 49. The manner in which flow through such openings 83, 85, 87 and ports 47, 49, 51 is controlled is described below. (For accuracy of description and ease of understanding, the identifying numerals for ports 47, 49 and 51 of the envelope 89 correspond to the same port numerals 47, 49 and 51 of the valve symbol shown in FIGS. 2 and 3.)

The valve body 71 and the envelope 89 are cooperatively configured for mutual sealing engagement as described below. The envelope 89 includes lands 91a, 91b, 91c to contact and respectively sealingly engage O-rings 79, 79a, 79b on the valve body 71 when such body 71 is inserted and secured within envelope 89. And the envelope 89 has fluid conduit regions 93, 95, 97 which are in flow communication with each of the actuator, drain and pressure sections 73, 75 and 77, respectively, when the body 71 is fully seated in the envelope 89.

The solenoid assembly 69 includes a solenoid housing 99, an electric coil 101 and an armature 103. When the coil is energized 101, the armature 103 moves to the right under the urging of electromagnetic force and against the force of the spring 63. And when the coil 101 is de-energized, the armature 103 moves to the left under the urging of the spring 63 and assumes the position shown in FIG. 4.

The armature 103 is coupled to a flow control mechanism 105 in a manner such that the armature 103 and the mechanism 105 move in unison. The mechanism 105 comprises a hollow spool 107, terminated on one end with an armature attachment button 109 and open on the opposite end. Such flow control mechanism 105 also includes an extension or plunger 111 coupled to the spool 107 and moving in unison with such spool 107. The plunger 111 has a pin 113 of dramatically-reduced cross-sectional area. Such area is selected so that the pin 113 fits through the opening 115 in the poppet 117 with clearance. The reasons for such construction will become apparent.

The maximum outside diameter of the spool 107 and inside diameter of the body 71 are cooperatively selected so that the spool 107 may freely move in the body 71 with slight sliding clearance. The spool 107 has lands 119 and lands 121 which are separated by a portion 123 of reduced diameter. And apertures 125 are formed in such portion 123 for permitting fluid flow as described below.

The valve 37 also has a check device 127 comprising the poppet 117 and a dart-shaped cone 129 inside of and concentric with such poppet 117. The poppet 117 slides in the chamber 131 and has an angled shoulder 133 which seals against the annular seat 135 during certain aspects of the operation of the valve 37. Similarly, the cone 129 seals against the annular seat 137 of the poppet 117 during certain aspects of valve operation.

It is to be appreciated that the cone 129 is urged rightwardly (in the views of, e.g., FIGS. 4 and 6) by a low-force spring 139, i.e., substantially lower than the force imposed by the spring 63 upon the spool 107. It is also to be appreciated that in the absence of flow forces described below, the spring 139 urges the cone 129 and, thus, the poppet 117 rightwardly to the positions shown in FIG. 7. And when the pin 113 urges the cone 129 away from the poppet 117 (leftwardly in FIG. 4), the poppet 117 is free to move solely under the urging of hydraulic forces.

Operation

Figure 6:
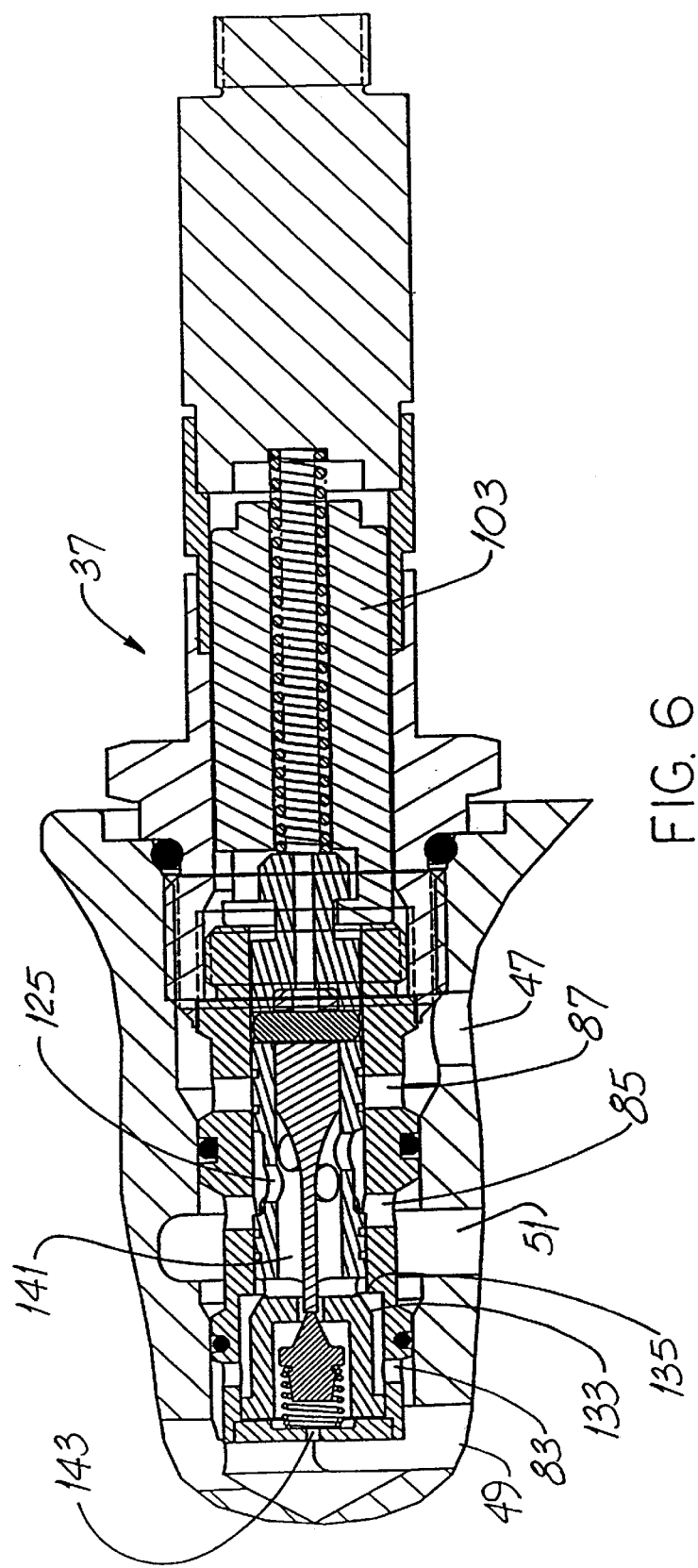
FIG. 6 is a sectional view of the valve of FIG. 4 assembled to the envelope of FIG. 5. The valve is shown in the solenoid de-energized position and valve components are positioned to vent to tank the brake release mechanism shown in FIGS. 2 and 3. Parts are broken away.

The operation of the new valve 37 and the brake control system 10 shown in FIGS. 2 and 3 will now be set forth. Referring to FIGS. 2, 4 and 6, it is assumed that the solenoid coil 101 is de-energized and, therefore, that the valve 37 is in the position shown in FIGS. 3 and 6. Fluid from the chamber 31 has been exhausted therefrom by flowing through the actuator port 49, through the opening 83, past the poppet shoulder 133 and seat 135, through the hollow center 141 of the spool 107, through the apertures 125 and through the opening 85 to the drain port 51. Fluid from the chamber 31 has also been exhausted through the opening 143, around the cone 129 and through the opening 115 to the spool center 141. Such fluid has thereby been directed to the reservoir 67. Therefore, the brake piston 27 is to the right and the brake 17 is set in that the friction members 19 and braking members 21, are engaged.

Figure 7:
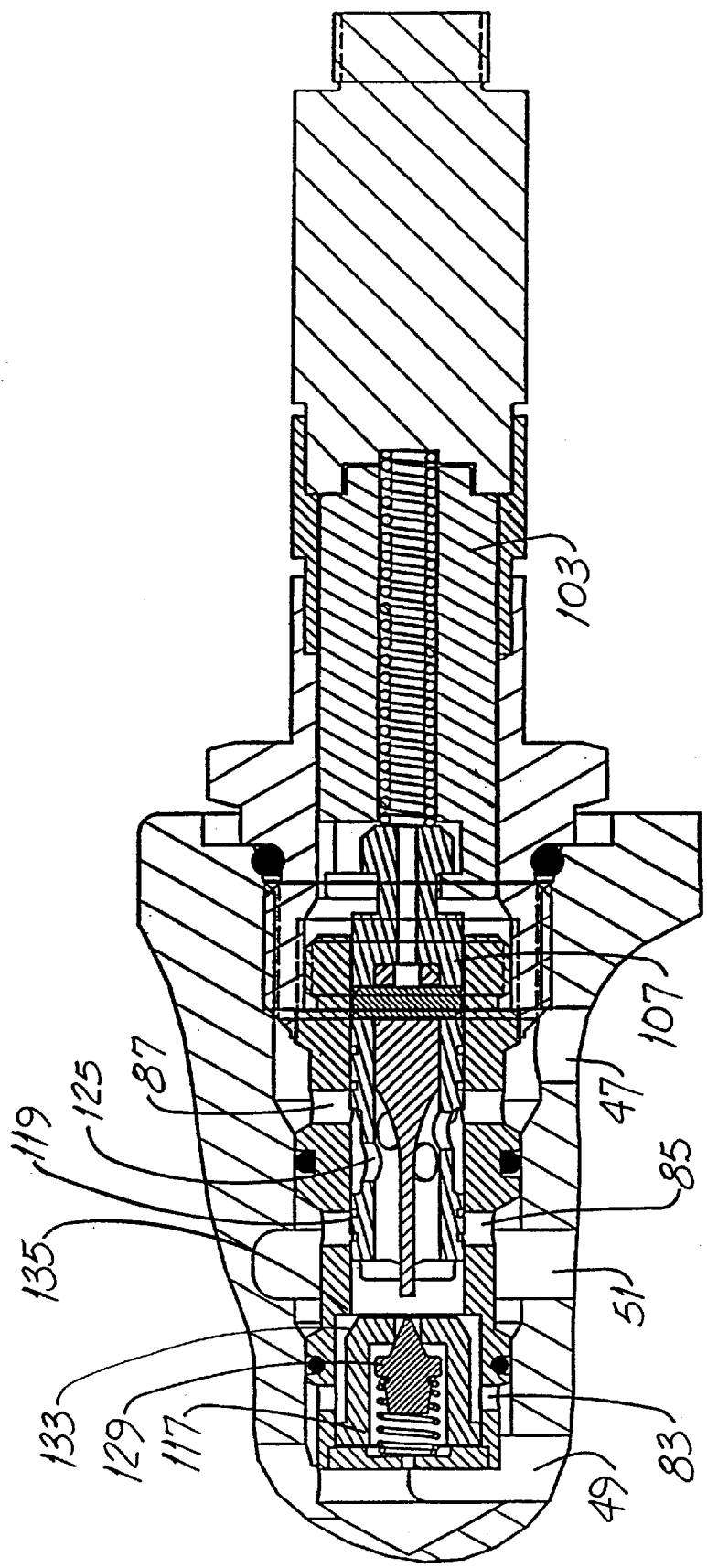
FIG. 7 is a sectional view of the valve of FIG. 4 assembled to the envelope of FIG. 5. The valve is shown in the solenoid-energized position and valve components are positioned to flow pressurized fluid from a source to the brake release mechanism shown in FIGS. 2 and 3. Parts are broken away.

Referring next to FIGS. 3, 4 and 7, it is next assumed that the tractor operator has taken steps to energize the coil 101 and release the brake 17. When the coil 101 is energized, the armature 103 and spool 107 move rightwardly to the position shown in FIG. 7 and the valve 37 is as shown in FIG. 3. In such position, the lands 119 close and block the openings 85 to the drain port 51 and the lands 121 uncover the openings 87, thereby putting such openings 87 in flow communication with the inlet port 47 and the pressure source 33.

Pressurized fluid flows from the port 47 through the openings 87 and through the apertures 125 to the poppet 117 and cone 129. The force resulting from the pressurized fluid overcomes the spring 139 and urges the poppet 117 and cone 129 leftwardly, thereby moving the poppet shoulder 133 away from the seat 135. Fluid flows through the space between the poppet shoulder 133 and seat 135 and thence through the openings 83 and actuator port 49 to the chamber 31 of the brake cylinder 23. The brake piston 27 is moved leftwardly and the brake 17 released.

Figure 8:
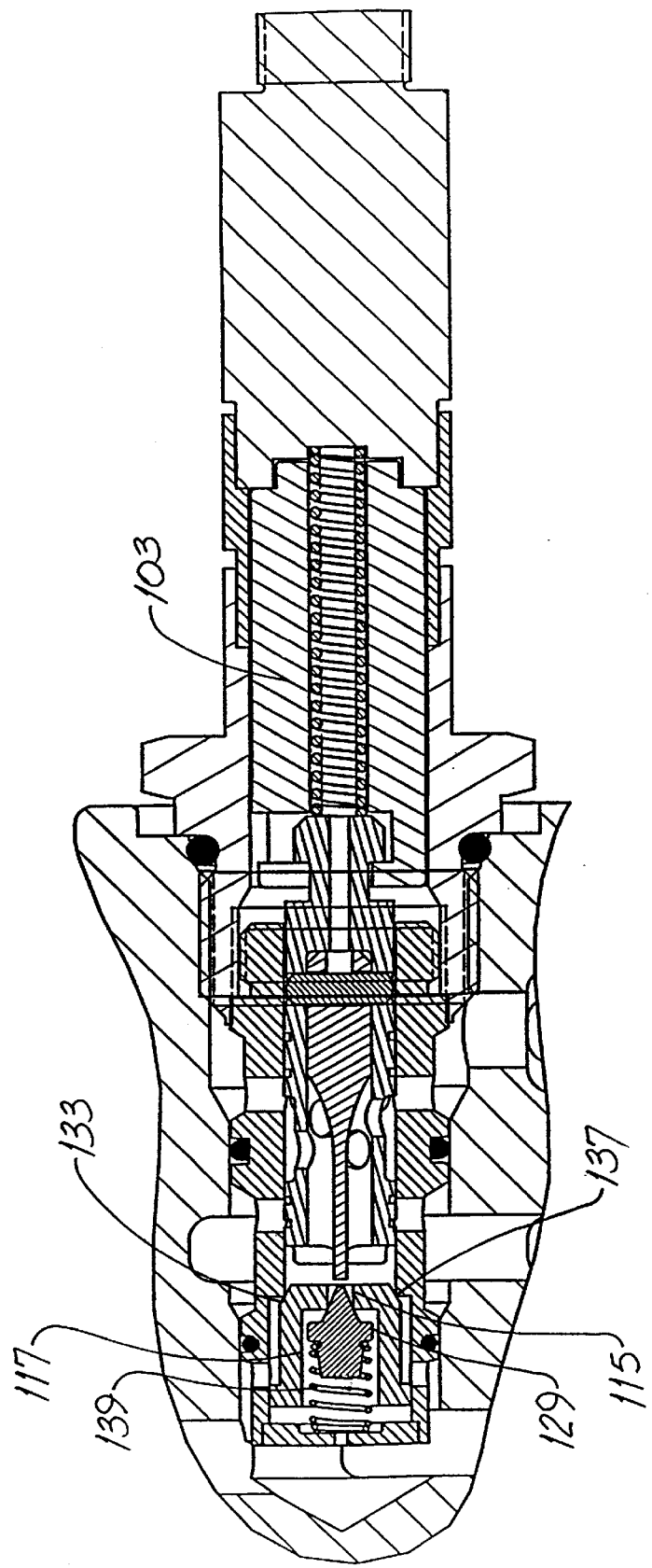
FIG. 8 is a sectional view of the valve of FIG. 4 assembled to the envelope of FIG. 5. The valve is shown in the solenoid-energized position and valve components are positioned as they would be when the pressure in the brake release is substantially equal to or greater than the pressure at the source. Parts are broken away.
Figure 9:
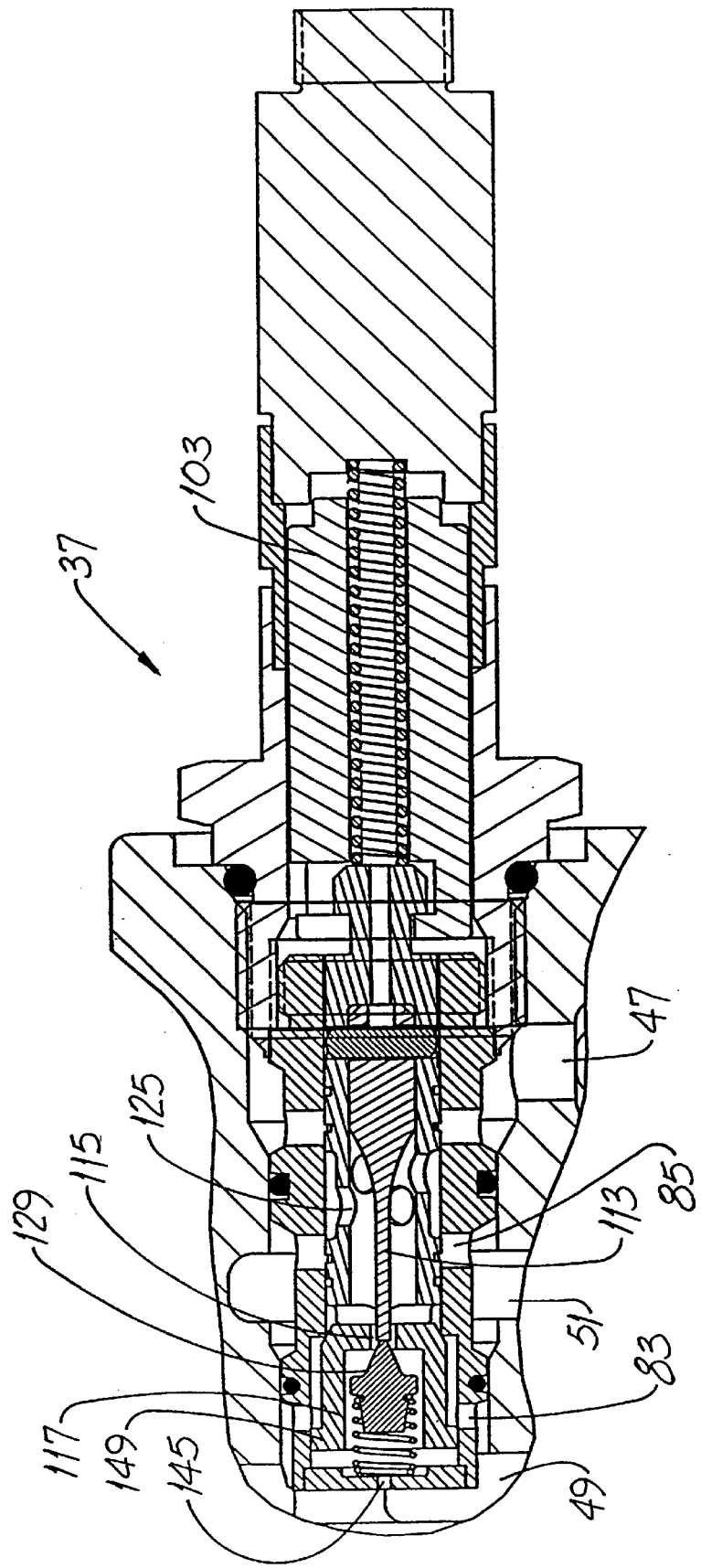
FIG. 9 is a sectional view of the valve of FIG. 4 assembled to the envelope of FIG. 5. The valve is shown after the solenoid has been de-energized and while valve components are in transitional movement from their positions shown in FIG. 8 to their positions shown in FIG. 6. Parts are broken away.

Referring next to FIGS. 3, 4 and 8, it is assumed that the coil 101 remains energized, that the brake 17 is fully released and that the fluid pressure on either side of the poppet 117 and cone 129 has substantially equalized. Because of the absence of any significant pressure differential across the poppet 117, the spring 139 urges the poppet 117 and cone 129 rightwardly so that the poppet shoulder 133 is against the seat 137; the cone 129 remains against the poppet 117 and seals the opening 115.

In the event the pressure at the source 33 diminishes, either momentarily or for some duration, below that in the chamber 31, the pressurized fluid is nevertheless trapped in the chamber 31 by the now-closed poppet 117 (against the seat 135) and cone 129 sealing the opening 115. Thus, the brake 17 is prevented from "grabbing" in the event of such diminishment.

Referring to FIGS. 2, 3, 4 and 9, FIG. 9 shows the valve 37 in a transition state in which the coil 101 has been de-energized to set the brake 17 and the armature 103 has been moved partially leftward by the spring 63. (Compare the relative positions of the armature 103 in FIG. 6 in which the armature 103 in its fully-leftward position and the position of such armature 103 in the transition position of FIG. 9.) The pin 113 has driven the cone 129 away from the poppet 117, thereby permitting pressurized fluid inside the poppet 117 to be relieved through the opening 115, the apertures 125 and the opening 85 to the drain port 51.

(It is to be noted that the pressure in the poppet 117 diminishes substantially to that at the drain port 51 because the cross-sectional area of the orifice 145 in the stationary body-mounted plate 147 is substantially smaller than that of the opening 115. To put it more in the vernacular, fluid is able to leave through opening 115 much more freely than fluid can enter the poppet 117 through the orifice 145.)

Referring now to FIGS. 2, 4 and 6, the pressurized fluid in the brake cylinder chamber 31 is communicated to and through the port 49 and the openings 83 in the body 71 to the annular poppet flange 149. The resulting force urges the poppet 117 leftwardly so that its shoulder 133 is away from the seat 135. As described above, fluid in the chamber 31 is thereby exhausted from such chamber 31 through the port 49, the openings 83, down the spool center 141, through the apertures 125 and through the holes 85 to the drain port 51.

From the foregoing, it is apparent that the first passage 39 includes (in the direction of fluid flow) the openings 87, the apertures 125, the hollow spool center 141, the annular space between the shoulder 133 and the seat 135, and the holes 83 and the brake port 49. And the loop second passage 45 includes the brake port 49, the holes 83, the space between the shoulder 133 and seat 135, the hollow spool center 141, the apertures 125, the openings 85 and the drain port 51.

The new method for controlling a brake 17 includes the steps of providing the brake 17 with a friction member 19, a brake member 21 and a spring 25 urging the friction member 19 toward the brake member 21 and also having a hydraulic release mechanism 29 containing fluid at a second pressure and retaining the friction member 19 in spaced relationship to the brake member 21.

The control valve 37 is configured to have a valve body 71 containing a check device 127 connected between the source 33 and the brake 17. The check device 127 is closed when the first pressure becomes less than the second pressure.

In a more specific aspect of the method, the configuring step includes configuring the control valve 37 with a flow control mechanism 105 mounted in the body 71 for movement between a first or "coil-de-energized" position shown in FIGS. 4 and 6, and a second or "coil-energized" position shown in FIGS. 7 and 8. And the closing step occurs when the mechanism 105 is in the first position. Even more specifically, the configuring step includes configuring the control valve 37 to have a brake port 49 and the method includes the step of connecting the brake port 49 directly to the brake release mechanism 29, i.e., to the chamber 31 and the piston 21 of the brake cylinder 23.

An advantage of the valve 37 (and, particularly, of the check device 127) disclosed herein as compared to that disclosed in the above-noted parent application is that such device 127 unseats at substantially higher pressures in the brake chamber 31. And that is not the only advantage. The new valve 37 has relatively few parts and such parts can be made and assembled in a straightforward manner. And the new valve 37 is easily manifold mounted.

While the invention is susceptible to various modifications and alternative forms, specific embodiments have been shown and described by way of example only. It should be understood that the invention is not intended to be limited to the particular forms disclosed. Rather, the invention is to cover all modifications, equivalents and variants falling within the spirit in scope of the invention as defined in the appended claims.

What is claimed:

1. A brake control system comprising a source of pressurized fluid, a brake and a control valve connected between the brake and the source and wherein the brake includes:

a friction member, a braking member and a spring for urging the friction member against the braking member;

a hydraulic release mechanism movable between a first position and a second position wherein friction member is away from the braking member;

and wherein the control valve includes:

a valve body;

a flow control mechanism in the body and mounted for movement between a first position and a second position; and a one-way valve comprising a check device and seat, the one-way valve being in series with the source and the brake when the mechanism is in the first position and wherein the check device retains the hydraulic release mechanism in the second position for a predetermined period of time when the flow control mechanism is in the second position.

2. The system of claim 1 wherein the control valve includes a brake port connected directly to the brake and a drain port connected to a hydraulic tank.

3. The system of claim 2 wherein:

the fluid source is at a first pressure;

the release mechanism is at a second pressure;

the control valve has a first passage containing the one-way valve and connecting the brake port and inlet port to one another when (a) the flow control mechanism is in the first position, and (b) the first pressure is greater than the second pressure; and the control valve has a second passage connecting the brake port and the drain port to one another when the flow control mechanism is in the second position.

4. The system of claim 3 wherein:

the one-way valve blocks the brake port when (a) the flow control mechanism is in the first position, and (b) the second pressure is greater than the first pressure.

5. The system of claim 3 wherein:

the flow control mechanism is mounted for movement along a valve axis;

the brake port is coincident with the axis; and the inlet port and the drain port are spaced from the axis.

6. The system of claim 5 wherein the one way valve is in series with the inlet port and the brake port when the mechanism is in the first position.

7. The system of claim 5 wherein:

the flow control mechanism includes a plunger retaining the check device away from the seat when the mechanism is in the second position.

8. The system of claim 7 wherein the brake port and the drain port are connected to one another when the mechanism is in the second position.

9. A method for controlling a brake connected in a brake control circuit having (a) a source of pressurized fluid at a first pressure, (b) a brake, and (c) a control valve connected between the brake and the source, the method including the steps of:

providing the brake with a friction member, a braking member and a spring urging the friction member toward the braking member and also having a hydraulic release mechanism containing fluid at a second pressure and retaining the friction member in spaced relationship to the braking member;

configuring the control valve to have a valve body containing a check valve connected between the source and the brake; and closing the check valve when the first pressure becomes less than the second pressure.

10. The method of claim 9 wherein:

the configuring step includes configuring the control valve with a flow control mechanism mounted in the body for movement between a first position and a second position; and the closing step occurs when the mechanism is in the first position.

11. The method of claim 9 wherein the configuring step includes configuring the control valve to have a brake port and the method includes the step of connecting the brake port directly to the release mechanism.

12. A brake control system for controlling the engagement of a friction member and a braking member of a brake, comprising:

a hydraulic release mechanism interconnected to the friction member and movable between first engaged position wherein the friction member engages the braking member and a second disengaged position wherein the friction member is disengaged from the braking member;

biasing structure for urging the hydraulic release mechanism toward the engaged position;

a control mechanism for controlling movement of the hydraulic release mechanism to the disengaged position in response to a brake release signal of predetermined strength thereon; and an anti-grabbing structure for maintaining the hydraulic release mechanism in the disengaged position for a predetermined time period subsequent to a decrease in the brake release signal below the predetermined strength.

13. The brake control system of claim 12 further comprising a source of pressurized fluid operatively connected to the hydraulic release mechanism, the pressurized fluid flowable though the control mechanism to the hydraulic release mechanism so as to urge the hydraulic release mechanism toward the disengaged position.

14. The brake control system of claim 13 wherein the control mechanism includes a flow regulator movable between a first actuated position allowing the pressurized fluid to flow therethrough to the hydraulic release mechanism and a second non-actuated position preventing the flow of pressurized fluid therethrough.

15. The brake control system of claim 14 further comprising a drain port connected to a hydraulic tank, the hydraulic release mechanism interconnected to drain port with the flow regulator in the non-actuated position so as to drain fluid therefrom.

16. The brake control system of claim 14 wherein the anti-grabbing structure is operatively connected to the hydraulic release mechanism, the anti-grabbing structure movable between a first position allowing the flow of fluid between the hydraulic release mechanism and the flow regulator, and a second position limiting the flow of fluid therethrough.

\* \* \* \* \*